US012168353B2

(12) United States Patent
Kabra et al.

(10) Patent No.: US 12,168,353 B2
(45) Date of Patent: Dec. 17, 2024

(54) UNIFIED BULK INK CARTRIDGE FOR THERMAL INKJET PRINTER

(71) Applicant: CONTROL PRINT LIMITED, Maharashtra (IN)

(72) Inventors: Shiva Basant Kabra, Mumbai (IN); Sunil Sadanand Wakade, Mumbai (IN); Rajender Choudhary, Mumbai (IN)

(73) Assignee: CONTROL PRINT LIMITED (IN)

( * ) Notice: Subject to any disclaimer, the term of this patent is extended or adjusted under 35 U.S.C. 154(b) by 0 days.

(21) Appl. No.: 17/626,840

(22) PCT Filed: Sep. 15, 2020

(86) PCT No.: PCT/IB2020/058566
§ 371 (c)(1),
(2) Date: Jan. 13, 2022

(87) PCT Pub. No.: WO2021/009737
PCT Pub. Date: Jan. 21, 2021

(65) Prior Publication Data
US 2022/0274415 A1 Sep. 1, 2022

(51) Int. Cl.
*B41J 2/175* (2006.01)

(52) U.S. Cl.
CPC ....... *B41J 2/17556* (2013.01); *B41J 2/17513* (2013.01); *B41J 2/17523* (2013.01); *B41J 2/17553* (2013.01); *B41J 2002/17516* (2013.01); *B41J 2/17526* (2013.01); *B41J 2/17563* (2013.01)

(58) Field of Classification Search
CPC ................ B41J 2/17556; B41J 2/17513; B41J 2/17523; B41J 2/17553; B41J 2/17526; B41J 2/17563; B41J 2002/17516
See application file for complete search history.

(56) References Cited

U.S. PATENT DOCUMENTS 5,280,300 A * 1/1994 Fong .................... B41J 2/17506 141/2
6,188,417 B1 2/2001 Keefe et al.
8,360,552 B2 1/2013 Justice et al.
8,794,750 B2 * 8/2014 Gilson ................. B41J 2/17566 347/87

* cited by examiner

*Primary Examiner* — Geoffrey S Mruk

(57) ABSTRACT

The present invention relates to a printer ink cartridge. The invention relates to a printer ink cartridge with unified bulk ink cartridge with an integrated ink bag having a greater ink storage capacity and reduced replacement frequency consequently reducing E-waste and preventing leakage in different orientation of printing.

9 Claims, 7 Drawing Sheets

UNIFIED BULK INK CARTRIDGE FOR THERMAL INKJET PRINTER

FIELD OF THE INVENTION

The present invention relates to a printer ink cartridge. More specifically, the present invention provides a unified bulk ink cartridge with an integrated ink bag for thermal inkjet printers in order to reduce E-waste and prevent leakage on different modes of printing and to overcome the issues such as hanging tube and level adjustment fiddling.

BACKGROUND OF THE INVENTION

There are different printing devices available in market such as solid ink printers, laser printers, dot matrix printers etc. These printers require different ink storage devices such as ribbons and cartridges to store inks, toner, solid ink, etc. Ink cartridges are generally used in inkjet printers that contain the ink that is deposited onto paper during printing. The cartridges primarily contain at least one ink reservoir and electronic contacts and a chip that communicates with the printer.

Ink cartridges are generally used in ink jet printers, which are categorised under non-impact/drop on demand printers. The inkjet printers are categorised under two broad classes based on their working principle i.e. thermal inkjet printers and piezoelectric inkjet printers.

The thermal inkjet printers, inside each ink reservoir contain a heating element with a metal plate or resistor. The basic principle behind working of thermal inkjet printers includes rapid heating and expulsion of ink from cartridge nozzles onto substrate. A lot of printer ink cartridges are passive devices i.e. they use passive components on a nozzle plate assembly such as resistors, to heat the ink in the cartridge to a point that it will expel from nozzles or openings in the jet/nozzle plate. The resistors are formed utilizing thick or thin film technology on a substrate. Typically, one resistor per nozzles is provided. These passive printer ink cartridges require an interface to control and driver circuitry on the printer to determine when each nozzle on the cartridge is to be fired. The printer sends control signals to the resistors on the cartridge to control the firing sequence of the jets as the cartridge moves along the page.

US20150375512A1 teaches about ink cartridge has a communication unit for allowing an ink storage chamber to communicate with a space outside a housing. The communication unit includes a communication port formed on an outside surface of the housing, a merging channel having an end which communicates with the communication port, and a plurality of branch channels, each having an end which communicates with the merging channel and the other end which communicates with the ink storage chamber. The main drawback of the invention is, the cartridge provide ink only in a specific direction.

US20180079219A1 teaches about a liquid cartridge is configured to be inserted into a liquid consuming apparatus in a first direction along a horizontal direction against an urging force directed in a second direction opposite the first direction, and thereby to be mounted to the liquid consuming apparatus. The liquid cartridge is configured to pivot about a pivot centre in the liquid consuming apparatus. The liquid cartridge includes a lower face, and the lower face includes a first portion and a second portion which are positioned further in the second direction than the pivot centre. The second portion is positioned further in the second direction than the first portion and is positioned further in the upward direction than the first portion. This invention does not teach about prevention of ink leakage and reduction of E-waste.

WO2014121637A1, disclosed about an ink cartridge detachably mounted on an ink-jet printer. The ink-jet printer comprises a plurality of device-side terminals (25) and a rod piece (22), wherein when an ink cartridge (10) is mounted on the ink-jet printer, the device-side terminals (25) can exert an elastic force onto the ink cartridge (10), and the rod piece (22) can move relative to the ink-jet printer. The ink cartridge (10) comprises: an ink cartridge body (101), an ink chamber (102) for containing ink being arranged inside the ink cartridge body; and a snap-fitting device (109) which is arranged on the upper portion of the ink cartridge body (101). The snap-fitting device (109) comprises a snap-fitting portion (1091) extending out towards the outside of the ink cartridge body, the snap-fitting portion (1091) being mated with an engagement portion arranged on the ink-jet printer so as to fix the ink cartridge. This invention solves the technical drawbacks related to ink cartridge but focuses on installation and disassembling operation and not on reduction of E-waste, prevention of ink leakage.

The cartridges already known in state of the art have small ink storage capacity and require frequent changing. Changing the cartridge is time consuming and due to small storage capacity of ink in cartridge there is increase in the e-waste as well as cost and after replacing the cartridge, the piping system remain outside the cartridge. Also, the currently used cartridge provides ink only in one orientation which is either “side on” or “top down” in the printer and if used in other orientation, the cartridge could result in leakage of the ink from the cartridge nozzles.

Therefore, there is a need of technology in the conventional cartridge system in order to overcome issues associated with the ink cartridges such as cost, time consumed in replacement and orientation.

OBJECT OF THE INVENTION

The main object of the present invention is to provide an ink cartridge with improved ink storage capacity.

Another object of the present invention is to provide an improved design of ink cartridge to prevent ink leakage.

Yet another object of the present invention is to provide a unified bulk ink cartridge with an integrated ink bag and adaptable for use in both “side on” and “top down” orientation.

Yet another object of the invention is to reduce E-waste as there is reduction in cartridge change over frequency.

Still another object of the invention is to provide an improved cartridge that overcomes the issues such as hanging tube and level adjustment fiddling.

SUMMARY OF THE INVENTION

The present invention provides a printer with improved ink cartridge. More specifically, the invention relates to a printer ink cartridge i.e. unified bulk ink cartridge with an integrated ink bag having a greater ink storage capacity and reduced replacement frequency consequently reducing E-waste and preventing leakage in different orientation of printing.

In an embodiment, the present invention provides a unified bulk ink cartridge for mounting in an ink jet printer. The unified bulk ink cartridge comprises of a cartridge housing that acts as an outer protective cover, a jet plate comprising ink ejection nozzles mounted to the housing, a fluid regulator, a bulk ink bag, an ink chamber and a plurality of interconnecting tubes. The unified bulk ink cartridge is adaptable for use in both "side on" and "top down" orientation. Optionally, the unified bulk ink cartridge is provided with a memory mounted to its housing. The memory stores data related to the types of printers such as configuration details, rate of ink droplet deposition and carriage speed with which the ink jet cartridge is operable.

In another embodiment, the present invention provides a jet/nozzle plate that is a tab circuit that contains all electronic resistor/heater and nozzles to push in/spit drop of ink out of nozzles upon heating. The jet/nozzle plate is integrated with an ink chamber that comprises of an ink inlet hose to feed ink to the cavities behind the nozzles. The ink inlet hose ensures sufficient amount of ink flow to the nozzles in jet/nozzle plate. Here, the shape of ink chamber provides an effective angle with respect to a substrate surface on which the printing has to take place making the unified ink cartridge adaptable for use in horizontal (side on) and vertical (top down) position.

In yet another embodiment, the present invention provides the fluid regulator comprising of components including an inlet port, a wire mesh/filter, a spring, a piston, a seal, a valve and an outer housing. The components of the fluid regulator are made of special materials that are chemical resistant and do not react with the printer ink that passes through it.

In another embodiment, the present invention, provides a processing of ink flow in a printer installed with unified bulk ink cartridge comprising steps of: receiving a command for printing on an electronic control unit (ECU) of the printer; receiving a signal for ink spit on nozzle plate of unified bulk ink cartridge; compressing of spring in fluid regulator of unified bulk ink cartridge and development of a negative pressure in the forward path i.e. interconnecting tube in the unified bulk ink cartridge; detecting if the interconnecting tube is free of bubbles; removing bubbles from the interconnecting tube; determining if negative pressure in forward path is greater than the spring force in fluid regulator; opening valve in the fluid regulator for ink flow and closing the valve for negative pressure lesser than spring force.

Therefore, the unified bulk ink cartridge in the present invention resolves the issue of tube hanging and level adjustment fiddling as it is an integrated system. The unified bulk ink cartridge supports a greater ink storage capacity thereby reducing the cartridge changeover frequency.

BRIEF DESCRIPTION OF THE DRAWING

The present invention will become more fully understood from the description and the accompanying drawings, wherein.

DETAILED DESCRIPTION OF THE INVENTION

Figure 1:
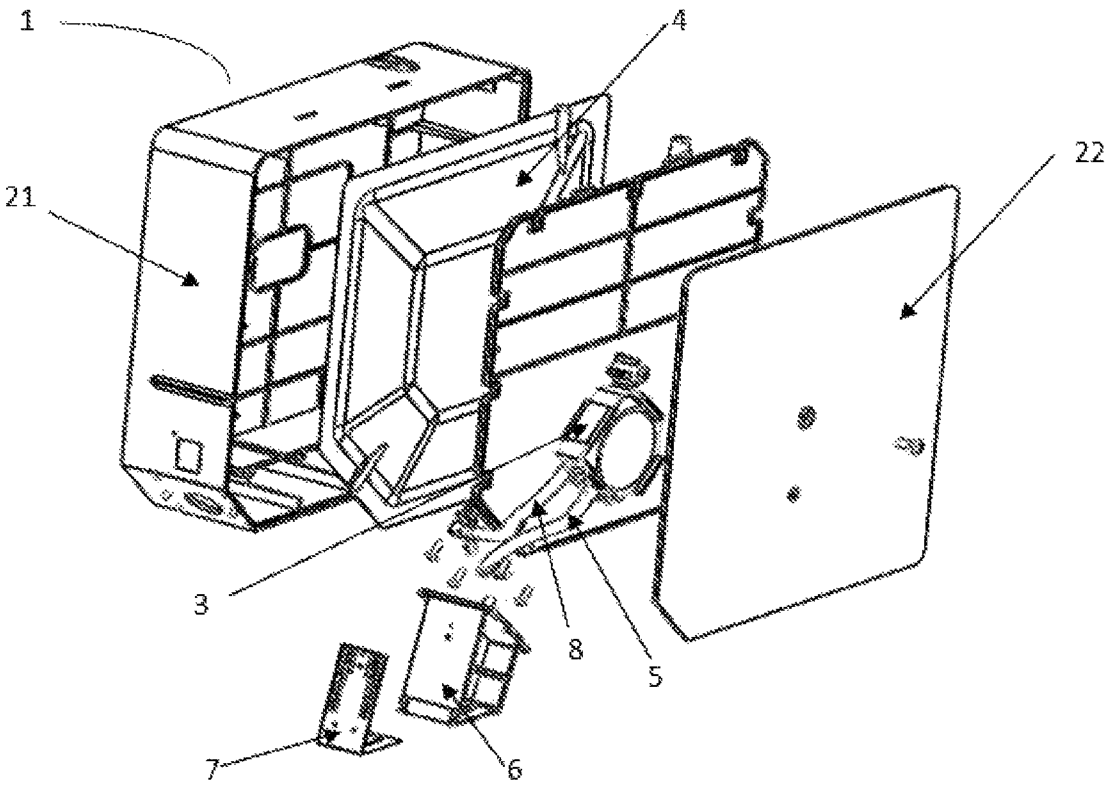
FIG. 1 shows an exploded view of the unified ink cartridge in accordance with the present invention.

The present invention will now be described in detail hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

In a most preferred embodiment, the present invention provides a bulk ink cartridge for mounting in an ink jet printer. The unified bulk ink cartridge comprises of a housing that acts as an outer protective cover, a jet plate comprising ink ejection nozzles mounted to the housing, a fluid regulator, a bulk ink bag, an ink chamber and a plurality of interconnecting tubes. The unified bulk ink cartridge is adaptable for use in both "side on" and "top down" orientation. Optionally, the unified bulk ink cartridge is provided with a memory mounted to its housing. The memory stores data related to the types of printers such as configuration details, rate of ink droplet deposition and carriage speed with which the ink jet cartridge is operable.

In another embodiment, the present invention provides a jet/nozzle plate that is a tab circuit that contains all electronic resistor/heater and nozzles to push in/spit drop of ink out of a plurality of ink ejection nozzles upon heating. The plurality of ink ejection nozzles have a size ranging from 20-28 μm which is 3-5 μm bigger compared to size of nozzles in jet plate of existing ink cartridges known in state of the art. The bigger size of nozzles help in achieving a good contrast as well as better throw distance. The print swathe of jet/nozzle plate which is equal to the height of the jet/nozzle plate is either 0.5 or 1 inch. The ink chamber that comprises of an ink inlet hose to feed ink to the cavities behind the nozzles. The ink inlet hose ensures sufficient amount of ink spits to the nozzles in jet/nozzle plate. Here, the shape of ink chamber provides an effective angle with respect to a substrate surface on which the printing has to take place making the unified ink cartridge adaptable for use in horizontal (side on) and vertical (top down) position.

In another embodiment, the present invention provides a fluid regulator that comprises of various components such as an inlet port, a wire mesh/filter, a spring, a piston, a seal, a valve and an outer housing. The components of the fluid regulator are made of special materials that are chemical resistant and do not react with the printer ink that passes through it. The fluid regulator is located inside the housing of the unified bulk ink cartridge connected with jet plate for maintaining flow of said printing ink as well as an optimum value of negative pressure in the range of 15-25 mm of $H_2O$ to prevent drooling of the printing ink through said nozzles.

In another embodiment, the present invention, provides a processing of ink flow in a printer installed with unified bulk ink cartridge comprising steps of: receiving a command for printing on an electronic control unit (ECU) of the printer; receiving a signal for ink spit on nozzle plate of unified bulk ink cartridge; compressing of spring in fluid regulator of unified bulk ink cartridge and development of a negative pressure in the forward path i.e. interconnecting tube in the unified bulk ink cartridge; detecting if the interconnecting tube is free of bubbles; removing bubbles from the interconnecting tube; determining if negative pressure in forward path is greater than the spring force in fluid regulator; opening valve in the fluid regulator for ink flow and closing the valve for negative pressure lesser than spring force. The ECU of printer uses a dedicated sensing unit to detect if the interconnecting tube which is the ink path is free of any bubbles. In case the ink path is not free of bubbles, the cartridge is made to undergo priming to get rid of bubbles or clogs and again detected for any bubbles. When the ink path is free of bubbles, it is determined if the negative pressure in forward path is greater than spring force in the fluid regulator. As soon as it is detected that the negative pressure is greater than spring force, the valve for ink flow in the fluid regulator placed below the spring is opened and the ink flows down in the forward line through the jet/nozzle plate. And, as soon as it is detected that the negative pressure is lesser than spring force the valve for ink flow is closed.

As depicted in FIG. 1, an exploded view of the unified ink cartridge is shown. Here, the unified ink cartridge (1) has a cartridge housing (2) that acts as an outer protective cover. The cartridge housing (2) has a two plate body wherein one of the plate (21) has a cavity to accommodate other components of unified ink cartridge (1) and the other plate (22) to cover the plate (21) to form the cartridge housing (2) enclosing the components of the unified ink cartridge (1) within. The components of the unified ink cartridge enclosed between the plates (21, 22) of the cartridge housing (2) include a bulk ink bag (4), a fluid regulator (3) and plurality of interconnecting tubes (5, 8). The cartridge housing (2) has a straight cut corner to which an ink chamber (6) integrated with a jet/nozzle plate (7) is connected.

Figure 2:
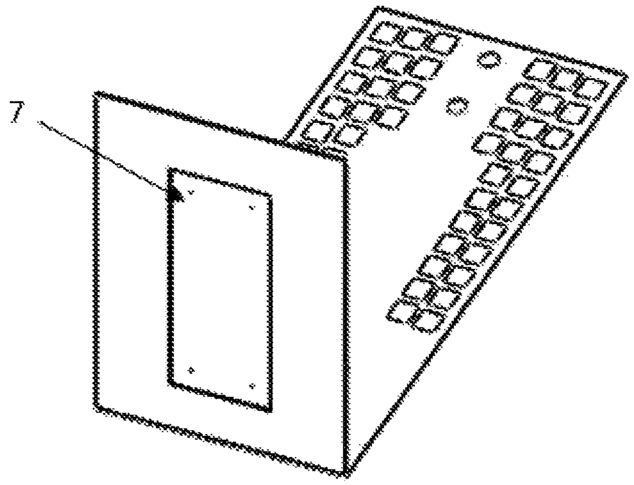
FIG. 2 shows a perspective view of the jet/nozzle plate in accordance with the present invention.

As depicted in FIG. 2, a perspective view of the jet/nozzle plate (7) is shown which has a plurality of nozzles to deliver the fluid to surface of a paper or object. The jet/nozzle plate (7) is an acutely bent strip in conformity with the shape of ink chamber (6). The jet/nozzle plate (7) is a tab circuit that contains all electronic resistor/heater and nozzles to push in drop of ink out of nozzles upon heating. The print swathe of jet/nozzle plate (7) which is equal to the height of the jet/nozzle plate is either 0.5 or 1 inch. In the jet/nozzle plate (7) of the present invention, the ink ejection nozzles have a size ranging from 20-28 μm. The size of nozzles is 3-5 μm bigger compared to size of nozzles in jet plate of existing ink cartridges known in state of the art. The bigger size of nozzles helps in achieving a good contrast as well as better throw distance.

Figure 3:
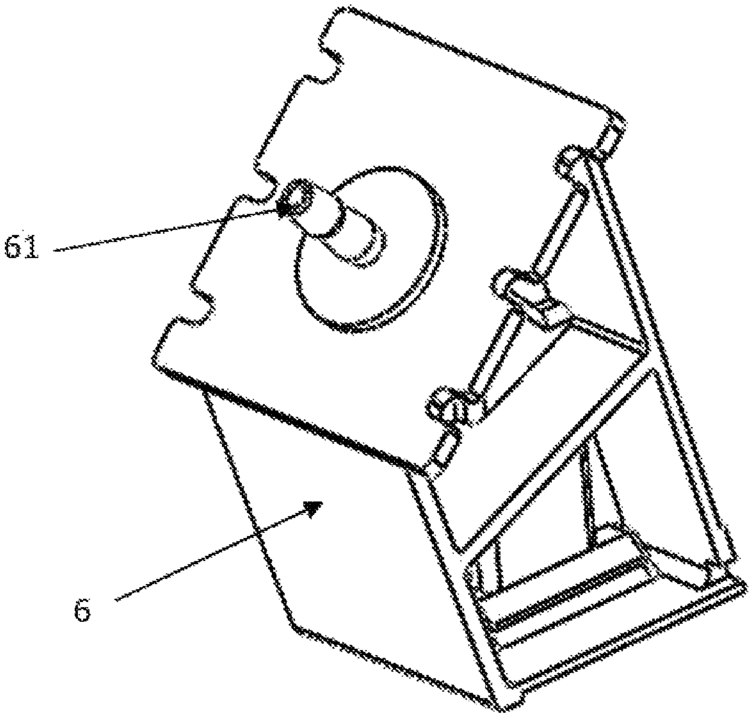
FIG. 3 shows a perspective view of the ink chamber in accordance with the present invention.

As depicted in FIG. 3, a perspective view of the ink chamber (6) is shown. The ink chamber (6) is designed such that it has a minimum overall weight and a structure that is rigid enough to bear pressure from electric pins that actuate the jet/nozzle plate. The ink chamber (6) comprises an ink inlet hose (61) to feed ink to the cavities behind the nozzles. The ink inlet hose (61) ensures sufficient amount of ink flow to the nozzles in jet/nozzle plate (7). Here, the shape of ink chamber (6) provides an effective angle with respect to a substrate surface on which the printing has to take place making the unified ink cartridge (1) adaptable for use in horizontal (side on) and vertical (top down) position.

Figure 4A:
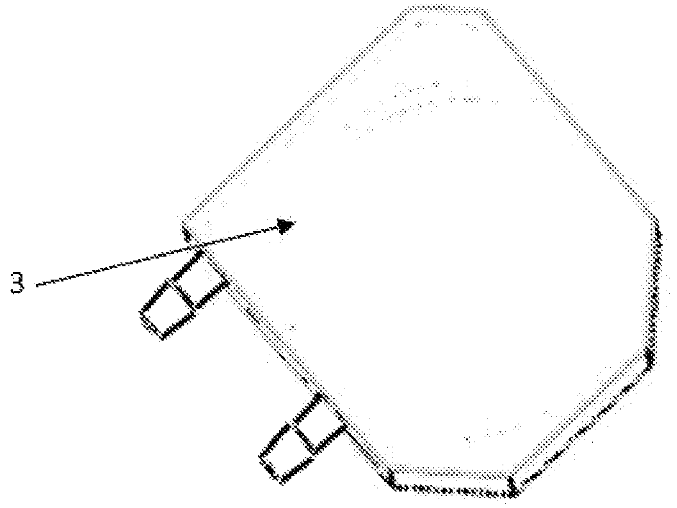
FIGS. 4*a* and 4*b* show a transparent view and exploded view of fluid regulator respectively in accordance with the present invention.
Figure 4B:
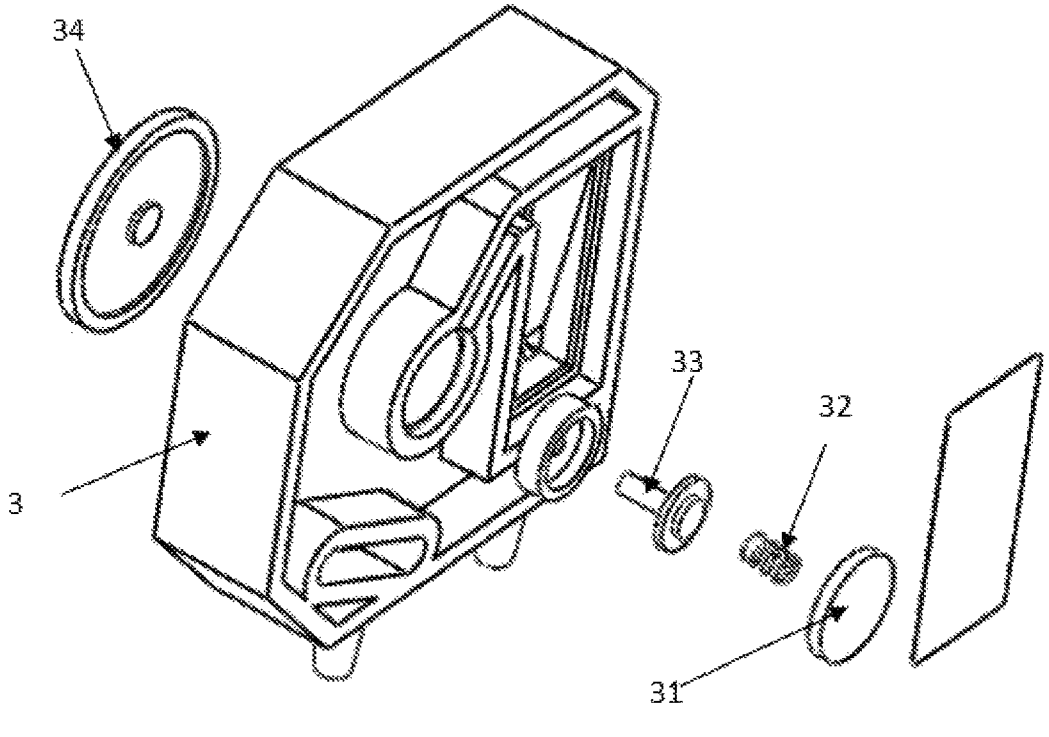

As depicted in FIG. 4*a*, a transparent view of fluid regulator (3) is shown. The fluid regulator (3) maintains an optimum ink flow as well as an optimum value of negative pressure required to prevent ink drooling through nozzles in the jet/nozzle plate (7). Now referring to FIG. 4*b*, the exploded view of fluid regulator (3) is shown. The fluid regulator (3) comprises of various components such as an inlet port, a wire mesh/filter (31), a spring (32), a piston (33), a seal (34) made of ethylene propylene diene monomer (EPDM), a valve and an outer housing. The components of the fluid regulator (3) are made of special materials that are chemical resistant and do not react with the printer ink that passes through it. Therefore, the fluid regulator (3) apart from maintaining ink flow and negative pressure additionally acts as a pre-filter.

Figure 5A:
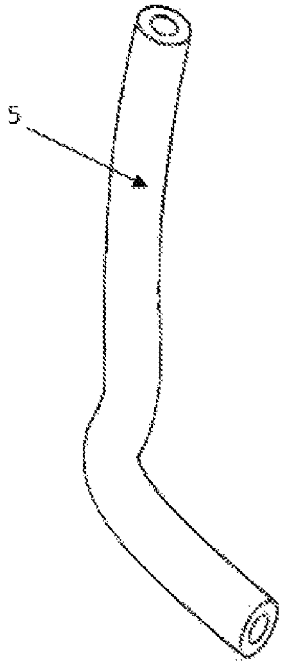
FIGS. 5*a* and 5*b* show a plurality of interconnecting tubes in accordance with the present invention.
Figure 5B:
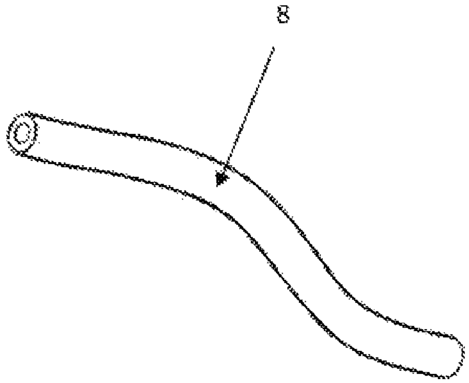

As depicted in FIGS. 5*a* and 5*b*, a plurality of interconnecting tubes (5, 8) are shown. The interconnecting tubes (5, 8) are made of chemical resistant material in order to ensure required chemical resistance for ink contained inside the unified ink cartridge (1). The interconnecting tubes (5, 8) are made flexible enough to adopt small space inside the unified ink cartridge (1) and elastic enough to maintain airtight contacts. The interconnecting tubes (5, 8) prevent inrush of air from atmosphere to prevent air bubbles accumulation. These interconnecting tubes (5, 8) are special application tubes made with a chemical resistant material to work effectively with approximately 20-30% of methyl ethyl ketone (MEK) contents in the ink.

Figure 6:
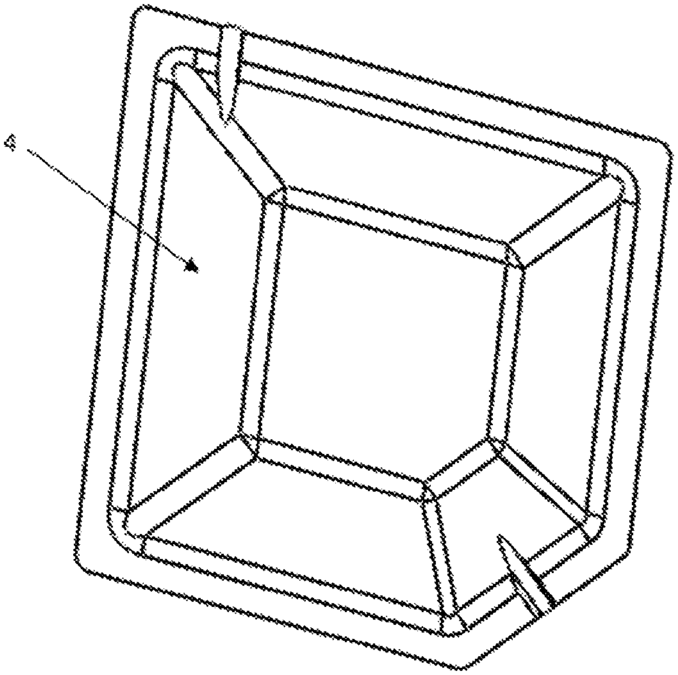
FIG. 6 shows a perspective view of the bulk ink bag in accordance with the present invention.

As depicted in FIG. 6, a perspective view of the bulk ink bag (4) is shown. The bulk ink bag (4) is a flexible container that inflates and deflates with a minimum force, such that ink is released easily under action of gravity during printing operation. The bulk ink bag (4) is filled with ink using a dedicated filling machine. The bulk ink bag (4) is preferably made of a multilayer film of polyethylene (PE) or aluminium foil or polyethylene terephthalate (PET). The bulk ink bag (4) prevents evaporation of ink to open atmosphere and helps in maintaining quality of ink for longer times during storage.

Figure 7A:
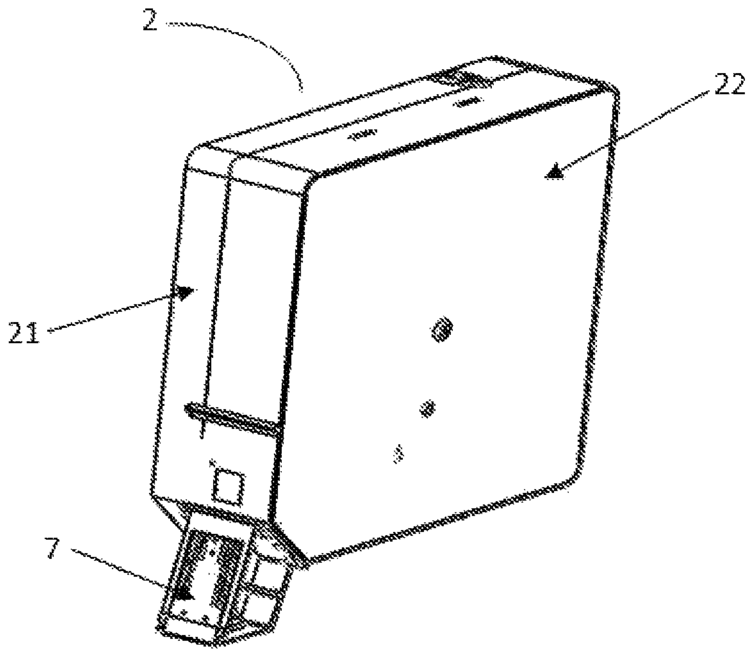
FIGS. 7*a*, 7*b* and 7*c* show a perspective, front and side view of the cartridge housing in accordance with the present invention.
Figure 7B:
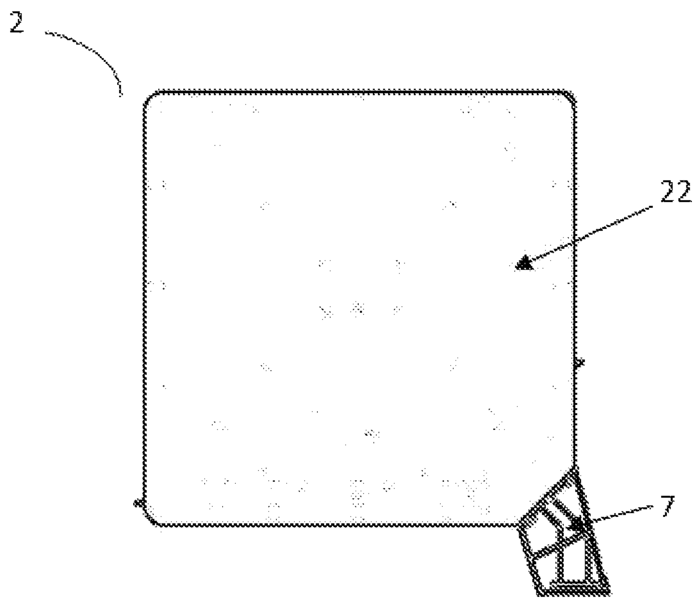
Figure 7C:
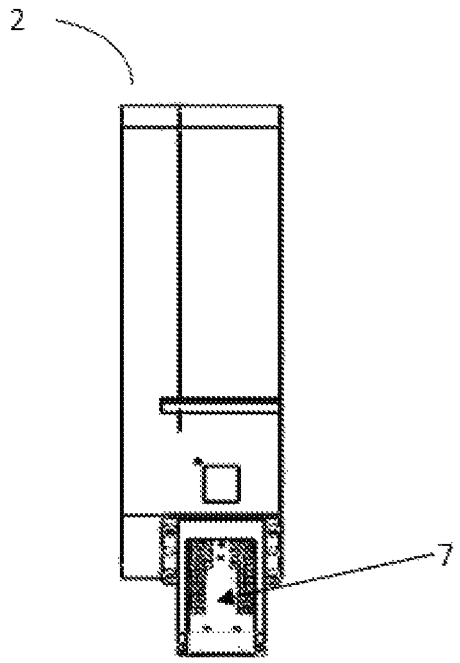

As depicted in FIGS. 7*a*, 7*b* and 7*c*, a perspective, front and side view of the cartridge housing (2) is shown. The cartridge housing (2) acts as an outer protective cover. The cartridge housing (2) has a two plate body wherein one of the plate (21) has a cavity to accommodate other components of unified ink cartridge (1) and the other plate (22) to cover the plate (21) to form the cartridge housing (2). The cartridge housing (2) has at least one straight cut corner to which the ink chamber (6) integrated with a jet/nozzle plate (7) is connected, helps in achieving delivery of maximum amount of ink while its use in both "side on" and "top down" orientation.

Figure 8:
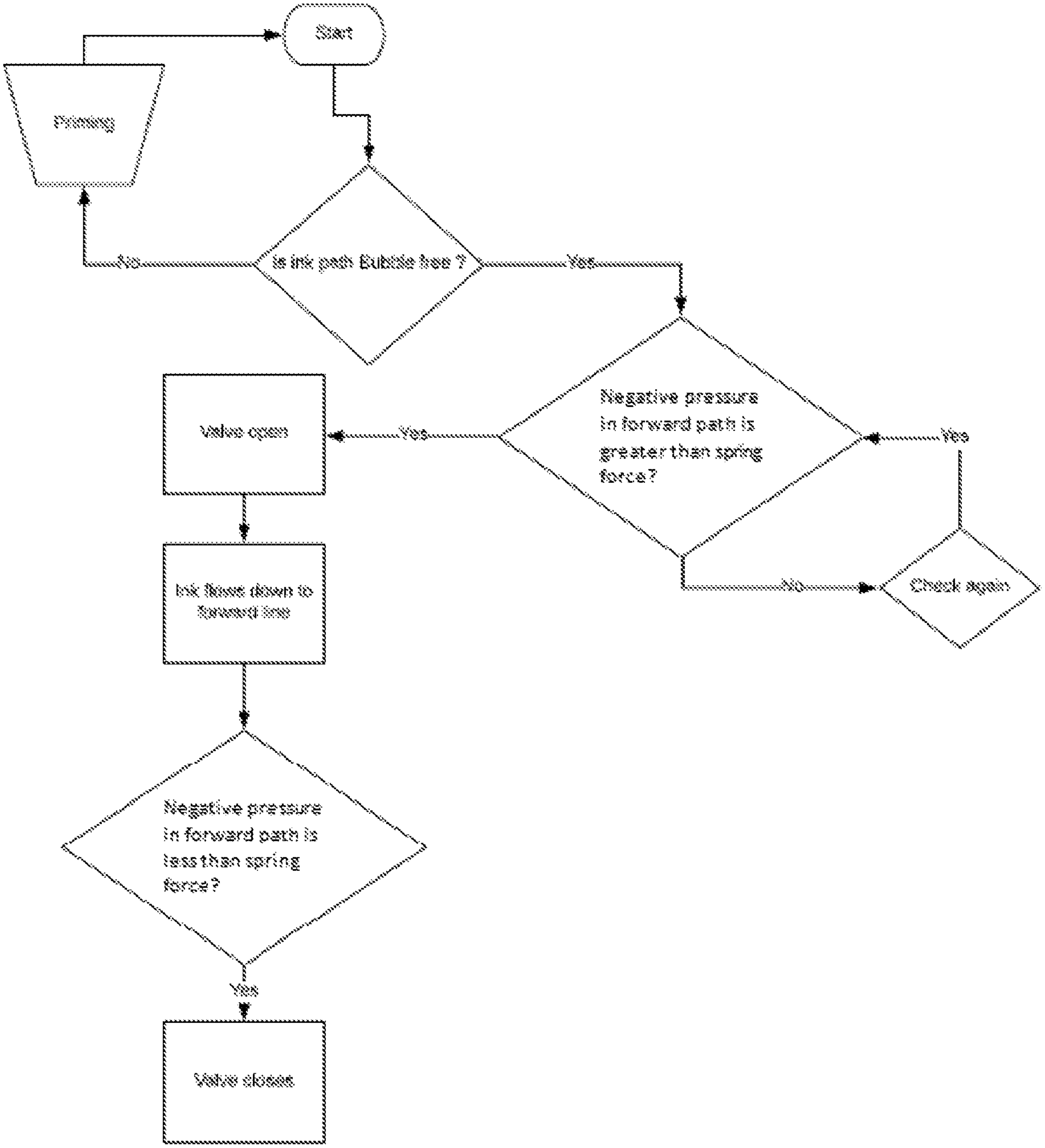
FIG. 8 shows a flow chart describing the working of unified ink cartridge in accordance with the present invention.

As depicted in FIG. 8, a flow chart describing the working of unified ink cartridge is shown. The electronic control unit (ECU) of the printer receives a command for printing, the nozzle plate receives a signal for ink flow, the spring in the fluid regulator gets compressed and a negative pressure gets developed in the forward path i.e. interconnecting tube (8). The ECU using a dedicated sensing unit, detects if the interconnecting tube (5) which is the ink path is free of any bubbles. In case the ink path is not free of bubbles, the cartridge is made to undergo priming to get rid of bubbles or clogs and again detected for any bubbles. When the ink path is free of bubbles, it is determined if the negative pressure in forward path (8) is greater than spring force in the fluid regulator. As soon as it is detected that the negative pressure is greater than spring force, the valve for ink flow in the fluid regulator placed below the spring is opened and the ink flows down in the forward line through the jet/nozzle plate. And, as soon as it is detected that the negative pressure is lesser than spring force the valve for ink flow is closed.

EXAMPLE 1

Unified Ink Cartridge

A unified ink cartridge is produced integrated with an ink bag having a maximum ink filling volume equal to 230 ml+/−5 ml. The unified ink cartridge was used in both "side on" and "top down" orientation. It was found that the average delivered ink volume is 226 ml. Hence, the unified ink cartridge is advantageous as it leaves less amount of residual ink inside the cartridge/ink bag. Also, as the storage capacity is more in the unified ink cartridge, the cartridge replacement frequency is less.

The aforementioned described specifications of all the components vary according to the printer drive, also the materials and size of the ink bag, chamber to be used and the like. Further, for generation of negative pressure additional member may be introduced which may be porous in nature, for instance like sponge or sieve.

Additionally, for adjusting the negative pressure, plurality of pulling or urging arrangements may be used, wherein the pulling or urging arrangements may include elasticity mechanism-based arrangements. By adjusting the negative pressure, proper meniscuses can be formed that results in high quality printing. Additionally, the housing may have plurality of ink bags, to supply several types of inks to the printer device for performing multiple colour printing.

Therefore, the present invention provides a unified ink cartridge with an increased storage capacity and reduced cartridge replacement frequency. It further reduces the E-waste as there is lesser cartridge replacement.

Many modifications and other embodiments of the invention set forth herein will readily occur to one skilled in the art to which the invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A unified bulk ink cartridge (1) comprising:

(a) a housing (2) acting as an outer protective cover of said cartridge (1);

(b) at least one bulk ink bag (4) filled with printing ink;

(c) at least one jet plate (7) mounted over said housing (2) for delivering said printing ink;

(d) at least one fluid regulator (3) to regulate flow of printing ink;

(e) at least one ink chamber (6); and (f) a plurality of interconnecting tubes (5, 8);

wherein, said at least one bulk ink bag (4) is located inside said housing (2) and inflates/deflates with a minimum force for printing;

said at least one fluid regulator (3) is located inside said housing (2) for maintaining flow of said printing ink as well as an optimum value of negative pressure in the range of 15-25 mm of $H_2O$ to prevent drooling of said printing ink through a plurality of nozzles;

said at least one ink chamber (6) integrated with said jet plate (7) is having a rigid structure to bear pressure from said jet plate (7) and makes said cartridge (1) adaptable for use in horizontal (side on) and vertical (top down) position; and said plurality of interconnecting tubes (5, 8) are flexible to accommodate inside said housing (2) and maintain air tight contacts to prevent inrush of air from atmosphere for avoiding air bubbles.

2. The cartridge (1) as claimed in claim 1, wherein said housing (2) has a two plate body having a plate (21) with cavity to accommodate said bulk ink bag (4), fluid regulator (3) and interconnecting tubes (5, 8) and a plate (22) to cover the plate (21).

3. The cartridge (1) as claimed in claim 1, wherein said cartridge (1) prevents evaporation of the printing ink to open atmosphere and helps in maintaining quality of said printing ink for long time during storage.

4. The cartridge (1) as claimed in claim 1, wherein said jet plate (7) is acutely bent step in conformity with shape of said ink chamber (6) and comprises of plurality of resistors/heaters to push said ink out of a plurality of ink ejection nozzles upon heating.

5. The cartridge (1) as claimed in claim 4, wherein said plurality of ink ejection nozzles have a size ranging from 20 to 28 μm to achieve an improved contrast and throw distance during printing.

6. The cartridge (1) as claimed in claim 1, wherein said at least one fluid regulator (3) comprise of an inlet port, a wire mesh/filter (31), a spring (32), a piston (33), a seal (34), at least one valve and an outer housing made of chemical resistant material to ensure no reaction with the printing ink while flowing and filtering.

7. The cartridge (1) as claimed in claim 1, wherein said chamber (6) comprises of an ink inlet hose (61) to feed the printing ink to the cavities present behind said plurality of ejection nozzles.

8. The cartridge (1) as claimed in claim 1, wherein said plurality of interconnecting tubes (5, 8) are made of chemical resistant material to ensure chemical resistance for ink contained in the bulk ink bag (4).

9. The cartridge (1) as claimed in claim 1, wherein said cartridge (1) is provided with a memory mounted over the housing (2) storing data related to various printers such as configuration details, rate of ink droplet deposition and carriage speed for use with said cartridge (1).

* * * * *